(12) United States Patent
Yu et al.

(10) Patent No.: US 7,904,478 B2
(45) Date of Patent: Mar. 8, 2011

(54) METHOD AND APPARATUS FOR DISPLAYING DATA MODELS AND DATA-MODEL INSTANCES

(75) Inventors: Jay J. Yu, Carlsbad, CA (US); Jesse M. Rodriguez, Hillsboro, CA (US); Evan M. Worley, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 393 days.

(21) Appl. No.: 12/020,178

(22) Filed: Jan. 25, 2008

(65) Prior Publication Data

US 2009/0193037 A1    Jul. 30, 2009

(51) Int. Cl.
*G06F 7/00* (2006.01)

(52) U.S. Cl. .......................... 707/790; 707/791; 707/798

(58) Field of Classification Search ..................... None
See application file for complete search history.

(56) References Cited

U.S. PATENT DOCUMENTS

| | | | |
|---|---|---|---|
| 5,701,460 A * | 12/1997 | Kaplan et al. | 707/748 |
| 6,968,340 B1 * | 11/2005 | Knowles | 1/1 |
| 7,629,986 B2 * | 12/2009 | Bobrow et al. | 345/629 |
| 2007/0016607 A1 * | 1/2007 | Yu et al. | 707/102 |

* cited by examiner

*Primary Examiner* — Hung Q Pham
(74) *Attorney, Agent, or Firm* — Park, Vaughan, Fleming & Dowter LLP; Laxman Sahasrabuddhe

(57) ABSTRACT

Embodiments of the present invention provide systems and techniques for displaying data models and data-model instances. During operation, the system can use a model graph to represent the data model and an instance graph to represent the data-model instance. In the graph representation, a vertex can represent an entity or an entity instance, and an edge can represent a relationship or a relationship instance. The system can display the model graph and the instance graph, either separately or concurrently, thereby enabling the user to visually explore the data model and the data-model instance by exploring the associated graphs. The system can display paths in the graphs to the user, thereby enabling the user to visually explore how entities and entity instances are related to one another. The system can also enable a user to search for entities and relationships using various criteria.

22 Claims, 6 Drawing Sheets

DATA MODEL
DIAGRAM
100

DATA MODEL
INSTANCE DIAGRAM
150

METHOD AND APPARATUS FOR DISPLAYING DATA MODELS AND DATA-MODEL INSTANCES

BACKGROUND

Related Art

Rapid advances in computing technology have made it possible to perform trillions of computational operations each second on datasets that are sometimes as large as trillions of bytes.

However, a software application's effectiveness is often determined not by computing speed, but by the effectiveness of its user interface. That is why the software industry is always looking for ways to improve user interfaces so that it can help increase user productivity. Unfortunately, user interfaces have struggled to keep up with the exponential increase in data sizes. Specifically, user interfaces of conventional data modeling tools are inadequate for exploring and manipulating large data models because the user interfaces were not designed to handle such large data models. Consequently, even though computers may have become powerful enough handle large data models, it is very difficult and costly to use large data models due to the inadequate user interfaces of conventional tools.

SUMMARY

One embodiment of the present invention provides a system that displays a data model. During operation, the system can use a graph to represent the data model. The data model can include entities which are related by relationships. An entity can be represented by a vertex in the graph, and a relationship can be represented by an edge in the graph. Next, the system can display the graph to a user, thereby enabling the user to visually explore the data model by exploring the graph. The system can then receive a request from the user to display how a first entity and a second entity are related to one another in the data model. Next, the system can determine paths in the graph between a first vertex which represents the first entity and a second vertex which represents the second entity. Each path in the graph can represent an alternating sequence of entities and relationships in the data model. The system can then display the paths in the graph to the user, thereby enabling the user to visually explore how the first entity and the second entity are related to one another in the data model.

In a variation on this embodiment, the system can display path expressions which are associated with the paths. A path expression can be an alternating sequence of entity names and relationship names. The path expressions can be used to determine how to access an instance of the second entity by using an instance of the first entity. Further, the path expressions can be used to determine a join statement in a relational database whose tables are associated with entities in the data model.

In a variation on this embodiment, the system can receive a second request from the user to highlight entities whose names include a second search string. The system can determine entities in the data model whose names include the second search string. Next, the system can highlight vertices in the graph which are associated with the entities.

In a variation on this embodiment, the system can receive a third request from the user to highlight relationships whose names include a third search string. Next, the system can determine relationships in the data model whose names include the third search string. The system can then highlight edges in the graph which are associated with the relationships.

One embodiment of the present invention provides a system that concurrently displays a data model and a data-model instance. During operation, the system can receive a data model and a data-model instance. The system can represent the data model and the data-model instance using a model graph and an instance graph, respectively. Next, the system can concurrently display the model graph and the instance graph to a user, thereby enabling the user to visually explore the model graph and the instance graph in a concurrent fashion.

In a variation on this embodiment, the system can determine a set of entity instances in the data-model instance which are associated with a user-selected entity in the data model. Next, the system can highlight vertices in the instance graph which are associated with the set of entity instances.

In a variation on this embodiment, the system can receive a search request from the user to highlight entities whose names include a search string. Next, the system can determine entities in the data model whose names include the search string. The system can then highlight vertices in the model graph which are associated with the entities. Next, the system can receive a user selection which identifies the user-selected entity.

In a variation on this embodiment, the system can receive a path which is an alternating sequence of entities and relationships. Next, the system can determine a set of path instances in the data-model instance which are associated with the path. The system can then highlight vertices and edges in the instance graph which are associated with the set of path instances.

One embodiment of the present invention provides a system that enables a user to identify entity instances which include an attribute which is associated with a user-specified attribute value. During operation, the system can represent the data-model instance using an instance graph. Next, the system can display the instance graph to a user, thereby enabling the user to visually explore the data-model instance by exploring the instance graph. The system can then receive a request from a user to highlight entity instances which include an attribute which is associated with a user-specified attribute value. Next, the system can determine entity instances in the data-model instance which include attributes which are associated with the user-specified attribute value. The system can then highlight vertices in the instance graph which represent the entity instances.

In a variation on this embodiment, the system can represent the data model using a model graph. Next, the system can display the model graph to the user, thereby enabling the user to visually explore the data model by exploring the model graph. The system can then determine entities in the data model which are associated with the entity instances which include attributes that are associated with the user-specified attribute value. Next, the system can highlight vertices in the model graph which represent the entities. Note that the system can concurrently display the model graph and the instance graph, thereby enabling the user to explore both entities and entity instances which have an attribute that is associated with the user-specified attribute value.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Data Models and Data-Model Instances

Data modeling is one of the important stages in software engineering. A data model is an abstract model which can be used to represent objects and interactions in the problem domain, and data modeling is the process of creating a data model. A data model is typically technology-independent since it is an abstract representation.

A data model can be described using a standardized graphical notation, e.g., an E-R (Entity-Relationship) diagram. An E-R diagram describes the data model using entities and relationships. Entities are typically used to represent "objects," "things," or "concepts," e.g., a person, a company, etc. Relationships are typically used to represent how entities relate to one another or how they interact with one another, e.g., an "is employee of," relationship relates a person with a company. Note that an E-R diagram is just one of many possible ways of describing a data model. For example, a data model can also be described using UML (Unified Modeling Language).

Figure 1A:
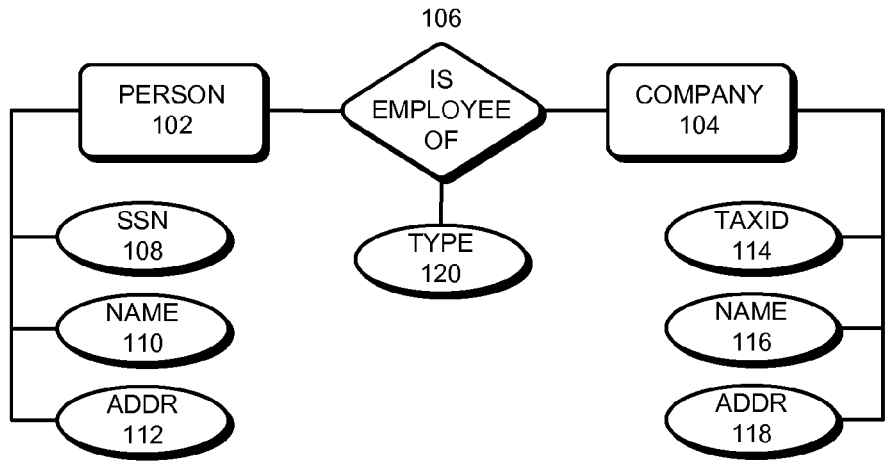
FIG. 1A presents a diagram which represents a data model in accordance with an embodiment of the present invention.

FIG. 1A presents a diagram which represents a data model in accordance with an embodiment of the present invention.

Data model diagram 100 represents a simple data model which comprises two entities which are related by a relationship. Specifically, the entity "person" 102 and the entity "company" 104 are related by the relationship "is employee of" 106.

Entities and relationships can have attributes. For example, person 102 has three attributes, namely, social security number (SSN) 108, name (NAME) 110, and address (ADDR) 112. Company 104 also has three attributes, namely, tax identification number (TAXID) 114, company name (NAME) 116, and company address (ADDR) 118. The relationship "is employee of," 106 has one attribute, namely, type of employee (TYPE) 120.

Although a data model describes how user data is organized and how different parts of the user data relate to one another, the data model usually doesn't contain user data. A data-model instance, on the other hand, contains user data and is generated when a data model is instantiated, i.e., when user data is received and then organized according to the data model. A data-model instance can include entity instances which are related to one another by relationship instances.

Figure 1B:
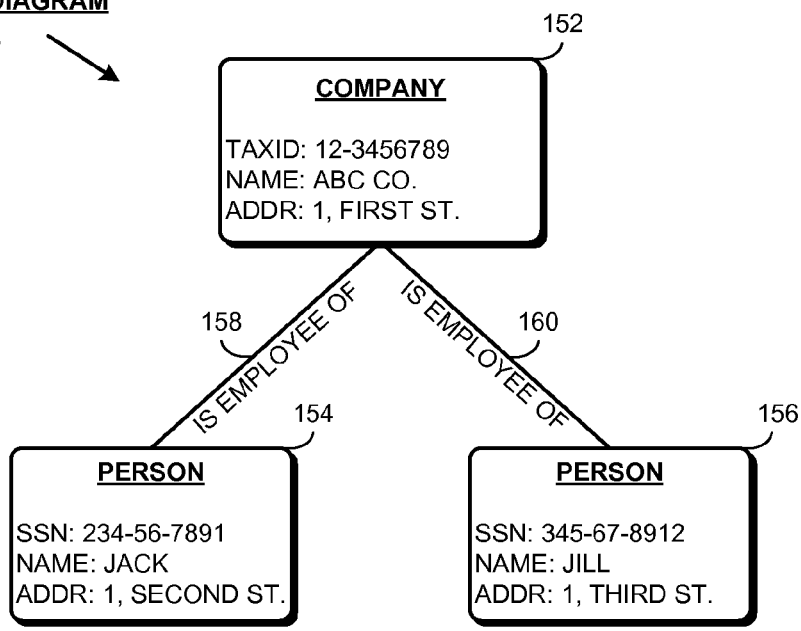
FIG. 1B presents a diagram which represents a data-model instance in accordance with an embodiment of the present invention.

FIG. 1B presents a diagram which represents a data-model instance in accordance with an embodiment of the present invention.

Data-model instance 150 includes entity instances 152, 154, and 156, and relationship instances 158 and 160. Entity instance 152 is an instance of the entity "company" 104, and entity instances 154 and 156 are instances of the entity "person" 102. Relationship instances 158 and 160 are instances of the relationship "is employee of" 106.

Entity and relationship instances usually associate attributes with values. For example, entity instance 152 associates attributes TAXID 114, NAME 116, and ADDR 118 with values "12-3456789," "ABC CO.," and "1, FIRST ST.," respectively. Entity instance 154 associates attributes SSN 108, NAME 110, and ADDR 112 with values "234-56-7891," "JACK," and "1, SECOND ST.," respectively. Entity instance 156 associates attributes SSN 108, NAME 110, and ADDR 112 with values "345-67-8912," "JILL," and "1, THIRD ST.," respectively. Although not shown in FIG. 1B, relationship instance 158 can associate attribute TYPE 120 with the value "TEMP" to indicate that employee "JACK" is a temporary employee, and relationship instance 160 can associate attribute TYPE 120 with the value "PERM" to indicate that employee "JILL" is a permanent employee.

The diagrams shown in FIGS. 1A and 1B are for illustration purposes and are not intended to be exhaustive or to limit embodiments of the present invention to the forms disclosed. Accordingly, many modifications and variations will be apparent to practitioners skilled in the art. For example, a relationship may indicate the role of the entities in the relationship, and it may also indicate the cardinality of the entities in the relationship. Specifically, the data model diagram may indicate that the "is employee of" relationship only works one way, i.e., the "person" entity "is employee of" the "company" entity, but not the other way around. The diagram may also indicate that multiple "person" entity instances can have an "is employee of" relationship with the same "company" entity instance.

The exponential increase in computing power has made it possible to create and process large data models that can have thousands of entities that are related to one another by tens of thousands of relationships. For example, a data model for a tax preparation software can easily have thousands of entities and tens of thousands of relationships. Unfortunately, conventional tools for exploring and manipulating data models were not designed to handle such large data models. Specifically, conventional tools don't enable a user to explore and visualize the model in an intuitive, efficient, and dynamic way, i.e., they don't enable the user to view the big picture of the data model and at the same time enable the user to intuitively and dynamically drill down to any level of detail. Further, conventional tools don't enable a user to examine a data model and the data-model instance at the same time. Hence, although computers have become very powerful, conventional tools make it very difficult and costly to use large data models due to their inadequate user interfaces.

Embodiments of the present invention provide a user interface that enables large data models and data-model instances to be explored and manipulated easily. Specifically, embodiments of the present invention use graphs to represent data models and data-model instances, and provide unique features for visually exploring and manipulating the graphs.

Using Graphs to represent Data Models and Data-Model Instances

Data models and data-model instances can be represented using graphs. For example, a data model can be represented by using vertices to represent entities and by using edges to represent relationships. Similarly, a data-model instance can be represented by using vertices to represent entity instances and by using edges to represent relationship instances.

Figure 2A:
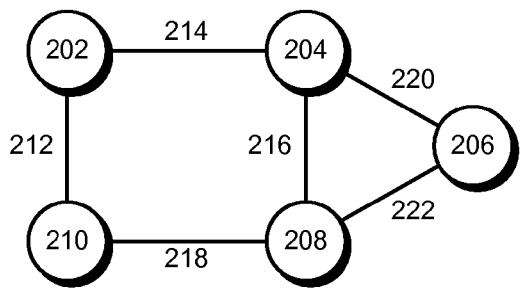
FIG. 2A illustrates how a graph can be used to represent a data model in accordance with an embodiment of the present invention.

FIG. 2A illustrates how a graph can be used to represent a data model in accordance with an embodiment of the present invention.

A graph can be generated from a data model by creating a vertex for each entity in the data model. Next, for each relationship that relates two entities, an edge can be added to the graph between the vertices that are associated with the entities. For example, vertices 202, 204, 206, 208, and 210 can be associated with entities in a data model, and edges 212, 214, 216, 218, 220, and 222 can be associated with relationships. Specifically, edge 212 can be associated with a relationship between two entities in the data model which correspond to vertices 202 and 210, edge 214 can be associated with a relationship between two entities in the data model which correspond to vertices 202 and 204, etc. A directed graph can also be used to represent a data model. Specifically, a directed edge can be used to represent that a relationship between two entities works only in one direction.

An entity's attributes can be stored with the associated vertex, and a relationship's attributes can be stored with the associated edge. For example, the data structure that is used to represent a vertex can include fields for storing the associated entity's attributes. Similarly, the data structure that is used to represent an edge can include fields for storing the associated relationship's attributes.

Figure 2B:
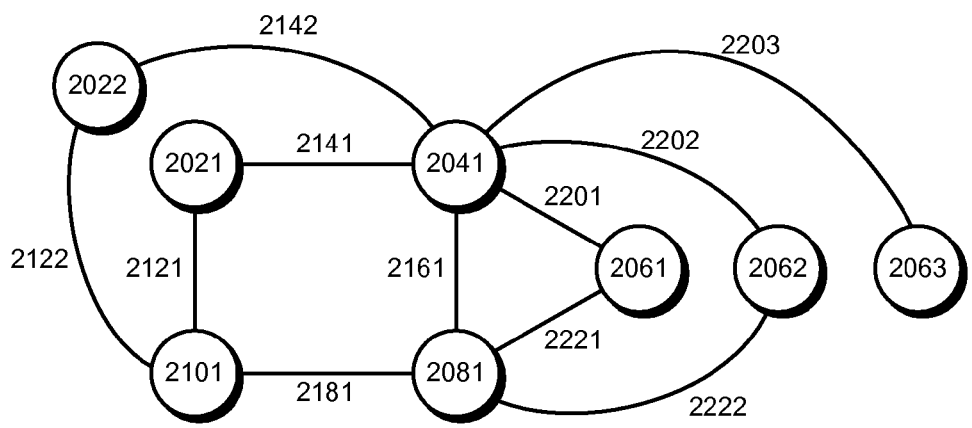
FIG. 2B illustrates how a graph can be used to represent a data-model instance in accordance with an embodiment of the present invention.
Figure 2B:
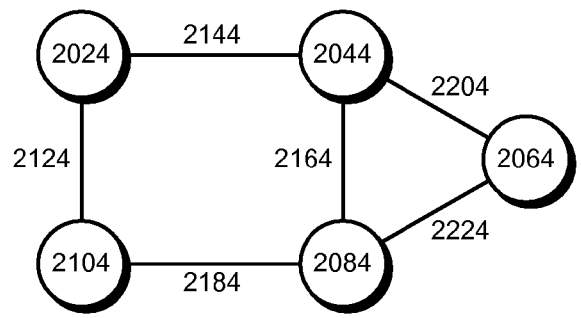

FIG. 2B illustrates how a graph can be used to represent a data-model instance in accordance with an embodiment of the present invention.

A graph can be generated from a data-model instance by creating a vertex for each entity instance in the data-model instance. Next, for each relationship instance that relates two entity instances, an edge can be added to the graph between the vertices that are associated with the entity instances. For example, vertices 2021, 2022, 2024, 2041, 2044, 2061, 2062, 2063, 2063, 2081, 2084, 2101, and 2104 can be associated with entity instances. Similarly, edges 2121, 2122, 2124, 2141, 2142, 2144, 2161, 2164, 2181, 2184, 2201, 2202, 2203, 2204, 2221, 2222, and 2224 can be associated with relationship instances. As was the case with data models, data-model instances can also be represented using directed graphs.

The vertices and edges in the model graph (i.e., the graph that represents the data model) can be associated with the vertices and edges in the instance graph (i.e., the graph that represents the data-model instance). For example, entity instances that are associated with vertices 2021, 2022, and 2024 can be instances of the entity that is associated with vertex 202. This creates an association between vertices 2021, 2022, and 2024 in the instance graph and the vertex 202 in the model graph. Similarly, relationship instances that are associated with edges 2141, 2142, and 2144 can be instances of the relationship that is associated with edge 214, thereby creating an association between edges 2141, 2142, and 2144 in the instance graph with the edge 214 in the model graph.

An entity or a relationship in a data model may be instantiated zero or more times in a data-model instance. For example, the entity that is associated with vertex 202 in the model graph has three instances which are associated with vertices 2021, 2022, and 2024 in the instance graph. Similarly, the relationship that is associated with edge 220 in the model graph has four instances which are associated with edges 2201, 2202, 2203, and 2204 in the instance graph.

As explained above, the data structure that is used to represent a vertex or an edge can include fields that correspond to the associated entity's or relationship's attributes. When an entity is instantiated, these fields can be assigned values based on the user data. For example, suppose the entity that is associated with vertex 202 has three attributes. Based on the user data, the system can instantiate an entity instance and assign values to these three attributes in the data structure associated with the entity instance. When the system creates a vertex that is associated with the entity instance (e.g., vertex 2021), it can assign the attribute values to the appropriate fields in the vertex data structure. Similarly, when the system creates an edge that is associated with a relationship instance, it can assign the relationship instance's attribute values to the appropriate fields in the edge data structure.

A path in the model graph can represent how two entities are related to each other. For example, consider the path between vertices 202 and 208 that traverses edges 212 and 218. The path indicates that the entity associated with vertex 202 is related to the entity associated with vertex 208. Specifically, the entity associated with vertex 202 is related to the entity associated with vertex 210 via the relationship associated with edge 212, and the entity associated with vertex 210 is related to the entity associated with the vertex 208 via the relationship associated with edge 218. Determining a path between two vertices can help a user to understand how the associated entities are related to one another, and can also help the user to determine how to access one entity from another entity. The system can use a number of techniques to determine paths between two vertices in a graph. In one embodiment, the system determines a shortest-path between two vertices in the graph. Alternatively, the system can determine a set of possible paths between two vertices and enable the user to individually explore the paths.

Similarly, a path in the instance graph can represent how two entity instances are related to each other, and can help the user to determine how to access one entity instance from the other entity instance. Two entity instances can only be related to each another in an instance graph if the associated entities are related to each other in the model graph. However, just because two entities are related in the model graph doesn't necessarily mean that the entity instances will be related in the instance graph. For example, although the entities associated with vertices 202 and 210 are directly related to one another in the model graph via relationship 212, the entity instances associated with vertices 2021 and 2104 are not related in the instance graph.

A path in the model graph can be represented by a path expression which can be an alternating sequence of entities and relationships that are associated with the vertices and edges that the path traverses. For example, the path between vertices 202 and 208 which traverses edges 212 and 218 can be expressed using a path expression that includes the following sequence of entity names and relationship names: the name of the entity associated with vertex 202, the name of the relationship associated with edge 212, the name of the entity associated with vertex 210, the name of the relationship associated with edge 218, and the name of the entity associated with vertex 208. Similarly, a path expression can be used to represent a path in the instance graph. Instead of using the names of entities and relationships, a path expression for a path in an instance graph can use an identifier that identifies entity instances and relationship instances along the path.

Note that multiple paths can exist between a pair of entities or entity instances. One embodiment of the present invention enables a user to identify multiple paths between two entities or entity instances. Further, the embodiment can enable a user to specify filter criteria which causes the system to highlight only those paths that match the filter criteria instead of displaying all paths. For example, each relationship and/or entity may include a type attribute or field which categorizes the entities and/or relationships into different categories. Next, the user may request the system to display or highlight paths between two entities which traverse entities and/or relationships that belong to a particular category or that belong to a set of categories. The embodiment can also provide a drop down menu to the user that includes a list of path expressions that are associated with the paths that are displayed on the screen.

Figure 3A:
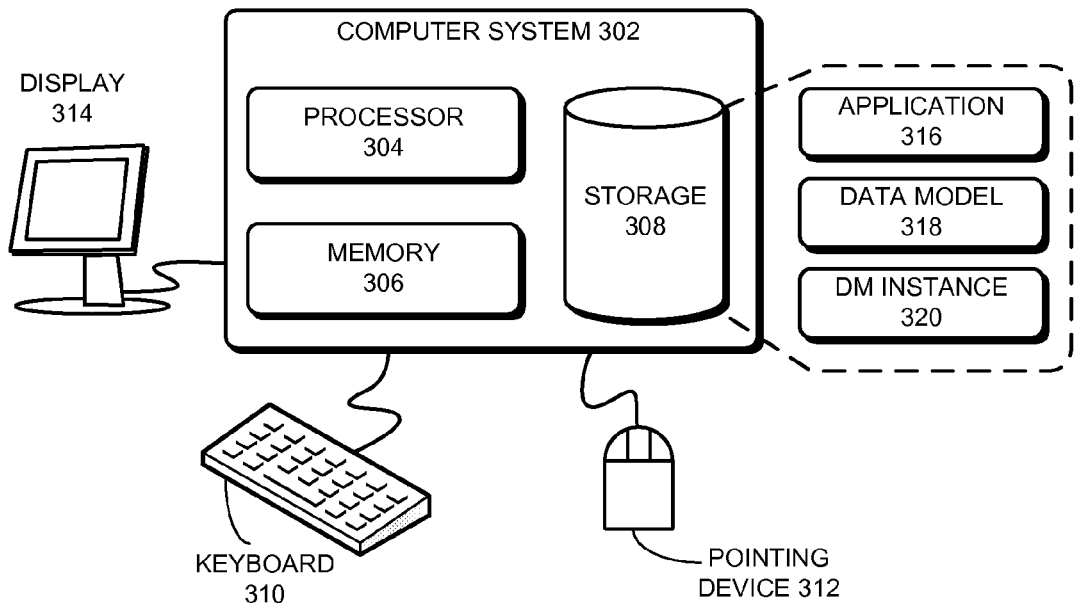
FIG. 3A illustrates a computer system that can be used to display a data model or a data-model instance in accordance with an embodiment of the present invention.

FIG. 3A illustrates a computer system that can be used to display a data model or a data-model instance in accordance with an embodiment of the present invention.

Computer system 302 comprises processor 304, memory 306, and storage device 308. Computer system 302 can be coupled to display 314, keyboard 310, and pointing device 312. Storage device 308 can store application 316, data model 318, and data-model instance 320.

During operation, computer system 302 can load application 316 into memory 306. Next, a user can use application 316 to create, explore, and manipulate a data model in memory 306 and store the data model on storage device 308. Similarly, the system can instantiate a data model in memory 306 to create a data-model instance, and store the data-model instance in storage device 308. The system can enable a user to explore and manipulate a data model or a data-model instance by displaying a graph to the user that is associated with the data model or the data-model instance. Specifically, the system can display the graph to the user on display 314, and enable the user to explore and manipulate the graph using keyboard 310 and pointing device 312.

Figure 3B:
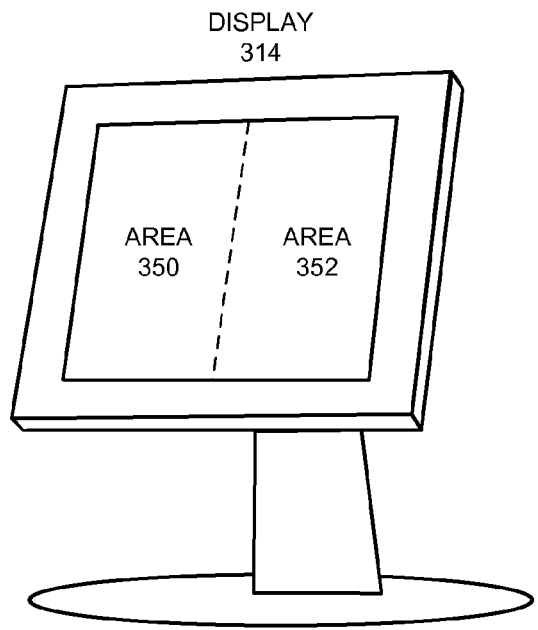
FIG. 3B illustrates how a model graph and an instance graph can be displayed in a concurrent fashion in accordance with an embodiment of the present invention.

FIG. 3B illustrates how a model graph and an instance graph can be displayed in a concurrent fashion in accordance with an embodiment of the present invention.

In one embodiment, the system concurrently displays two graphs to the user: a model graph in area 350 and an instance graph in area 352. Note that display 314 can be partitioned along a horizontal axis instead of being partitioned along a vertical axis as shown in FIG. 3B. Alternatively, the system can display both the model graph and the instance graph in the same area, and enable the user to move the graphs on the screen as he or she wishes. The user can then explore and manipulate these graphs in a concurrent fashion. For example, the user can select an entity in the model graph in area 350 and the system can highlight the associated entity instances in the instance graph in area 352.

The above-described embodiments are not intended to be exhaustive or to limit the present invention to the forms disclosed. Accordingly, many modifications and variations will be apparent to practitioners skilled in the art.

Processes for Displaying Data Models and Data-Model Instances

Figure 4:
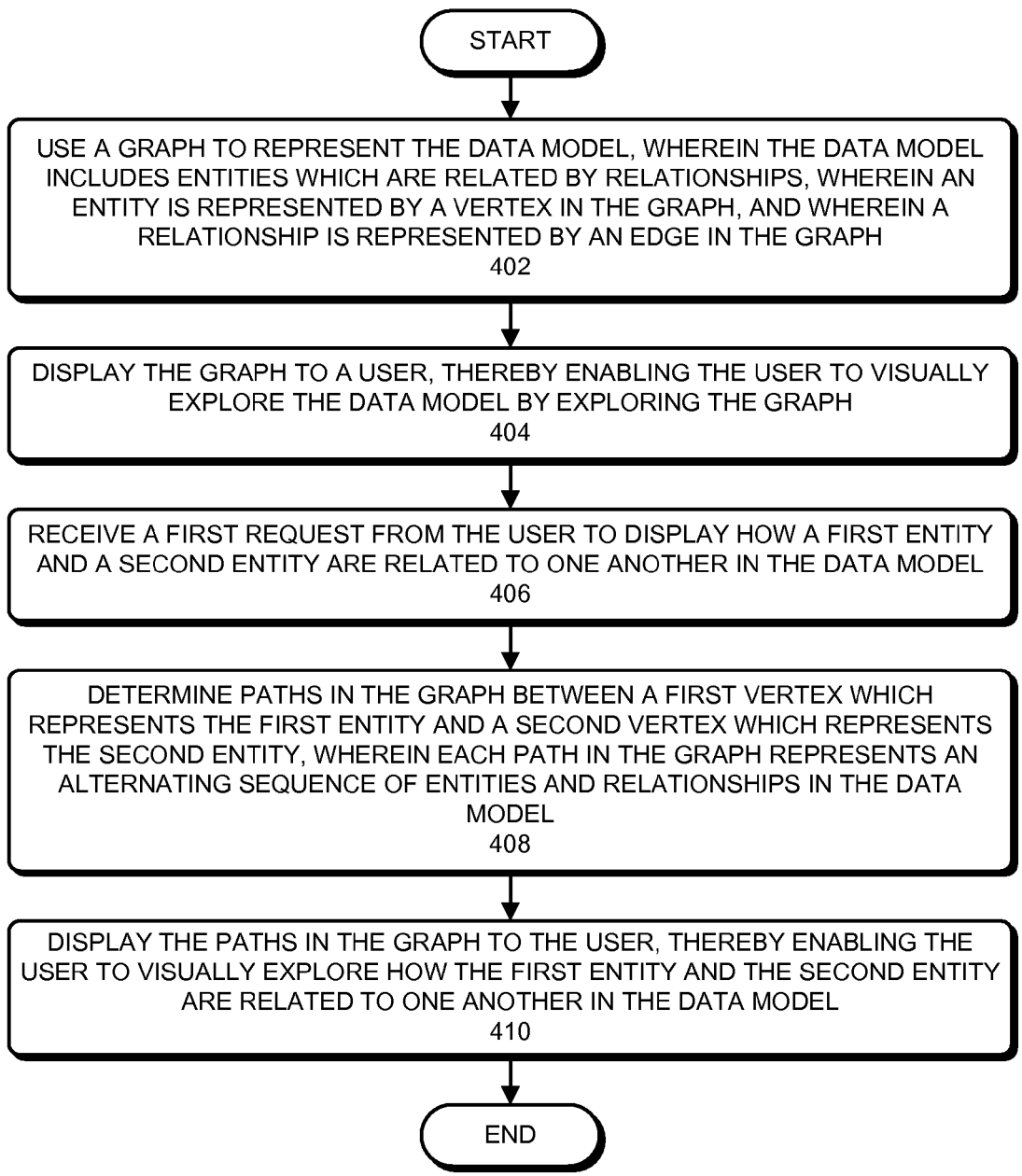
FIG. 4 presents a flowchart which illustrates a process for displaying paths in a data model in accordance with an embodiment of the present invention.

FIG. 4 presents a flowchart which illustrates a process for displaying paths in a data model in accordance with an embodiment of the present invention.

The process can begin by using a graph to represent the data model, wherein the data model includes entities which are related by relationships, wherein an entity is represented by a vertex in the graph, and wherein a relationship is represented by an edge in the graph (step 402).

Next, the system can display the graph to a user, thereby enabling the user to visually explore the data model by exploring the graph (step 404).

The system can then receive a first request from the user to display how a first entity and a second entity are related to one another in the data model (step 406)

Next, the system can determine paths in the graph between a first vertex which represents the first entity and a second vertex which represents the second entity, wherein each path in the graph represents an alternating sequence of entities and relationships in the data model (step 408).

The system can then display the paths in the graph to the user, thereby enabling the user to visually explore how the first entity and the second entity are related to one another in the data model (step 410).

Each path that is displayed to the user can be associated with a path expression which can be an alternating sequence of entity names and relationship names. A user can use the path expressions to determine how to access an instance of the second entity by using an instance of the first entity. If the entities in the data model are associated with tables in a relational database, the user can use a path expression to determine a join statement in the relational database. In particular, the path expression can indicate the table names and the column names that can be used in the join statement.

The system can enable the user to select entities by searching for entities whose names include a search string. Specifically, the system can receive a request from the user to highlight entities whose names include a search string. Next, the system can determine entities in the data model whose names include the search string. The system can then highlight vertices in the graph which are associated with the entities. Once the user views the highlighted vertices, the user can then select the desired entity by selecting the associated vertex in the graph.

Similarly, the system can also enable the user to select relationships by searching for relationships whose names include a search string. Specifically, the system can receive a request to highlight relationships whose names include a search string. Next, the system can determine relationships in the data model whose names include the search string. The system can then highlight edges in the graph which are associated with the relationships. Once the user views the highlighted edges, the user can then select the desired relationship by selecting the associated edge in the graph.

Figure 5:
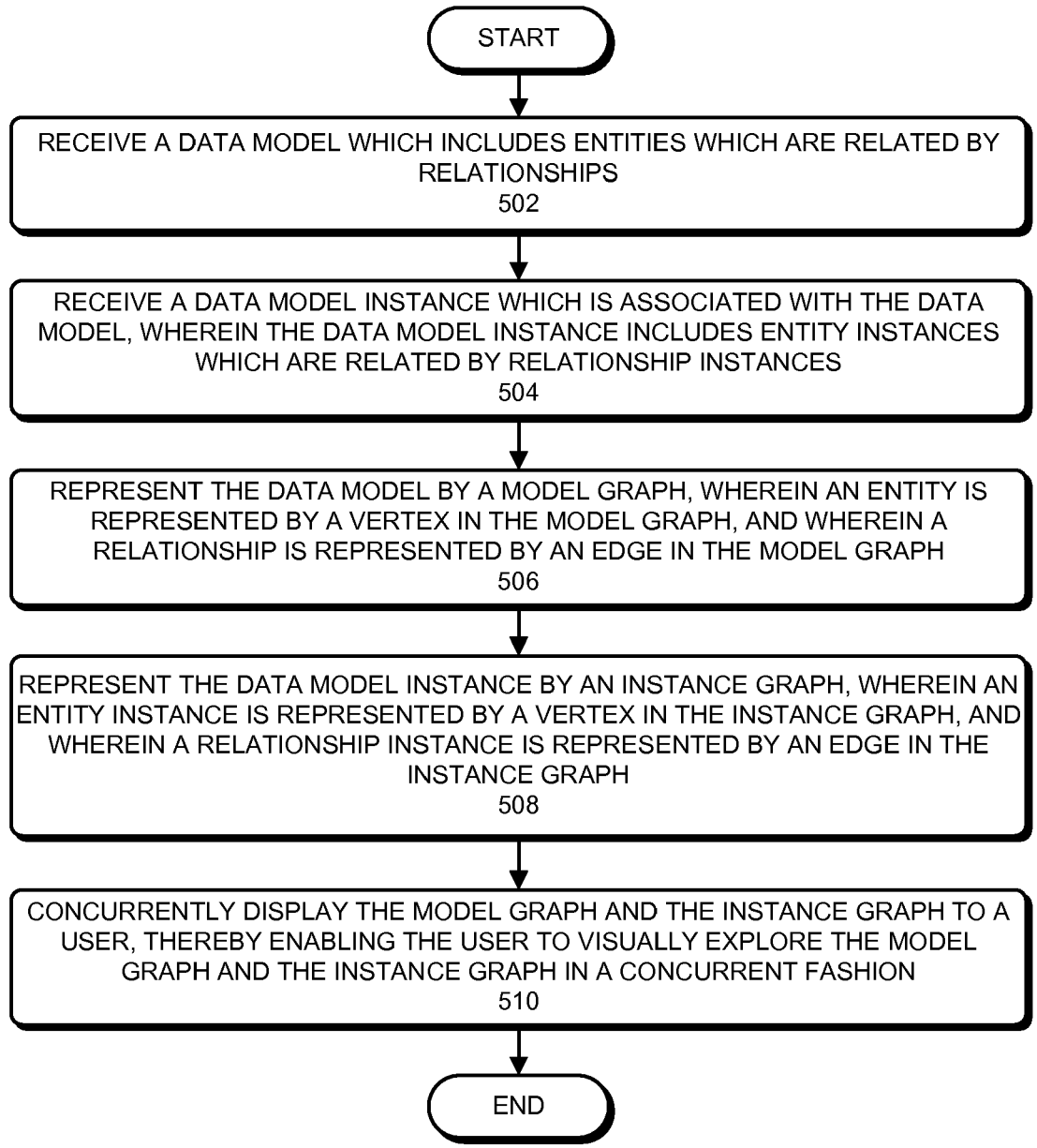
FIG. 5 presents a flowchart which illustrates a process for concurrently displaying a data model and an associated data-model instance in accordance with an embodiment of the present invention.

FIG. 5 presents a flowchart which illustrates a process for concurrently displaying a data model and an associated data-model instance in accordance with an embodiment of the present invention.

The process can begin with receiving a data model which includes entities which are related by relationships (step 502). Next, the system can receive a data-model instance which is associated with the data model, wherein the data-model instance includes entity instances which are related by relationship instances (step 504).

The system can then represent the data model by a model graph, wherein an entity is represented by a vertex in the model graph, and wherein a relationship is represented by an edge in the model graph (step 506).

Next, the system can represent the data-model instance by an instance graph, wherein an entity instance is represented by a vertex in the instance graph, and wherein a relationship instance is represented by an edge in the instance graph (step 508).

The system can then concurrently display the model graph and the instance graph to a user, thereby enabling the user to visually explore the model graph and the instance graph in a concurrent fashion (step 510).

Concurrently displaying the model graph and the instance graph can enable a user to explore the interrelationships between the data model and the data-model instance. For example, the system can receive a search request from the user to highlight entities whose names include a search string. Next, the system can determine entities in the data model whose names include the search string. The system can then highlight vertices in the model graph which are associated with the entities. The user can then select a vertex in the model graph which represents an entity in the data model. Next, the system can determine a set of entity instances in the data-model instance which are associated with the user-selected entity in the data model. The system can then highlight vertices in the instance graph which are associated with the set of entity instances.

Similarly, the system can enable a user to identify a relationship in the data model by: selecting an edge in the model graph, determining relationship instances in the data-model instance which are associated with the relationship, and highlighting edges in the instance graph which are associated with the relationship instances. The system can also enable a user to search for path instances in the data-model instance. For example, the system can receive a path which is an alternating sequence of entities and relationships. Next, the system can determine a set of path instances in the data-model instance which are associated with the path. The system can then highlight vertices and edges in the instance graph which are associated with the set of path instances.

Figure 6:
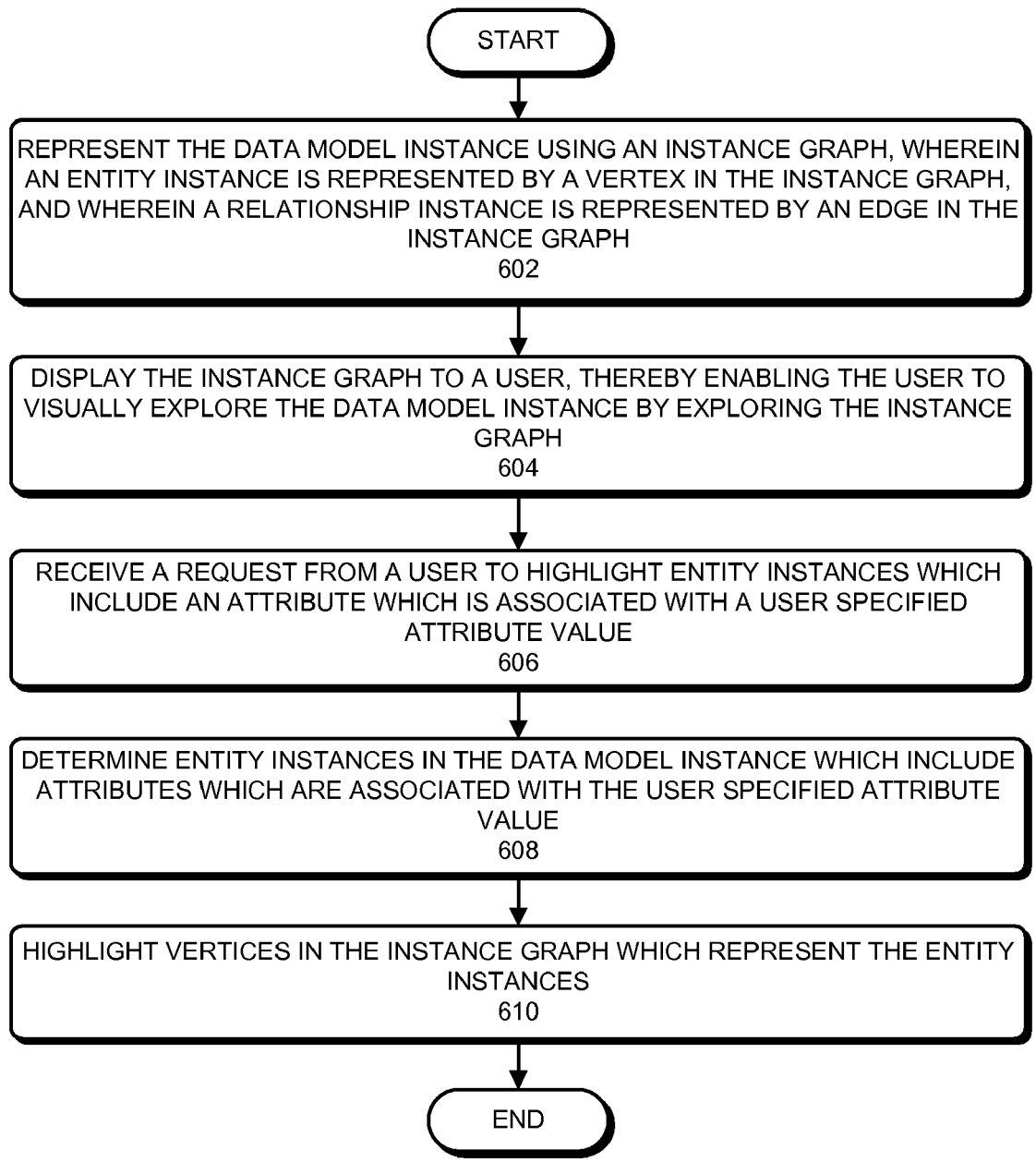
FIG. 6 presents a flowchart which illustrates a process to search for entity instances which include an attribute which is associated with a user-specified attribute value in accordance with an embodiment of the present invention.

FIG. 6 presents a flowchart which illustrates a process to search for entity instances which include an attribute which is associated with a user-specified attribute value in accordance with an embodiment of the present invention.

As before, the process can begin by representing the data-model instance using an instance graph, wherein an entity instance is represented by a vertex in the instance graph, and wherein a relationship instance is represented by an edge in the instance graph (step 602).

Next, the system can display the instance graph to a user, thereby enabling the user to visually explore the data-model instance by exploring the instance graph (step 604).

The system can then receive a request from a user to highlight entity instances which include an attribute which is associated with a user-specified attribute value (step 606).

Next, the system can determine entity instances in the data-model instance which include attributes which are associated with the user-specified attribute value (step 608).

The system can then highlight vertices in the instance graph which represent the entity instances (step 610).

Note that the data-model instance is an instance of a data model. As explained above, the system can represent the data model using a model graph, and concurrently display the model graph and the instance graph to enable the user to explore the data model and the data-model instance in a concurrent fashion. The system can also identify entities which are associated with the entity instances which have an attribute which is associated with the user-specified attribute value, and highlight vertices that are associated with the entities. This can help a user to quickly identify entities whose instances have an attribute value which is associated with the user-specified attribute value.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying a data model, the method comprising:
    generating a model graph visualization to represent the data model and an instance graph visualization to represent an instance of the data model, wherein the data model includes entities which are related by relationships, wherein a vertex represents an entity in the model graph visualization or an entity instance in the instance graph visualization, and wherein an edge represents a relationship in the model graph visualization or a relationship instance in the instance graph visualization;
    concurrently displaying the model graph visualization and the instance graph visualization to a user;
    receiving a first request from the user to query a relationship between a first entity and a second entity in the data model, wherein the first request comprises selecting an edge in the displayed model graph visualization by the user;
    in response to the received first request, determining, by using at least a computer, paths in the displayed instance graph visualization between a first vertex which represents a first entity instance and a second vertex which represents a second entity instance, wherein each determined path in the displayed instance graph visualization represents an alternating sequence of entity instances and relationship instances in the instance of the data model; and
    highlighting the determined paths in the displayed instance graph visualization to the user for exploring how the first entity and the second entity are related to one another in the data model.

2. The method of claim 1, further comprising displaying path expressions which are associated with the determined paths, wherein a path expression is an alternating sequence of entity names and relationship names.

3. The method of claim 2, further comprising using the displayed path expressions to determine how to access an instance of the second entity by using an instance of the first entity.

4. The method of claim 2, wherein the entities in the data model are associated with tables in a relational database, and wherein the method further comprises using the displayed path expressions to determine a join statement in the relational database.

5. The method of claim 1, further comprising:
receiving a second request from the user to highlight entities whose names include a second search string;
determining entities in the data model whose names include the second search string; and
highlighting vertices in the displayed instance graph visualization which are associated with the determined entities.

6. The method of claim 1, further comprising:
receiving a third request from the user to highlight relationships whose names include a third search string;
determining relationships in the data model whose names include the third search string; and
highlighting edges in the displayed instance graph visualization which are associated with the determined relationships.

7. A non-transitory computer-readable storage medium storing instructions that when executed by a computer cause the computer to perform a method for displaying a data model, the method comprising:
generating a model graph visualization to represent the data model and an instance graph visualization to represent an instance of the data model, wherein the data model includes entities which are related by relationships, wherein a vertex represents an entity in the model graph visualization or an entity instance in the instance graph, and wherein an edge represents a relationship in the model graph visualization or a relationship instance in the instance graph visualization;
concurrently displaying the model graph visualization and the instance graph visualization to a user;
receiving a first request from the user to query a relationship between a first entity and a second entity in the data model, wherein the first request comprises selecting an edge in the displayed model graph visualization by the user;
in response to the received first request, determining paths in the displayed instance graph visualization between a first vertex which represents a first entity instance and a second vertex which represents a second entity instance, wherein each determined path in the displayed instance graph visualization represents an alternating sequence of entity instances and relationship instances in the instance of the data model; and
highlighting the determined paths in the displayed instance graph visualization to the user for exploring how the first entity and the second entity are related to one another in the data model.

8. The non-transitory computer-readable storage medium of claim 7, wherein the method further comprises displaying path expressions which are associated with the determined paths, wherein a path expression is an alternating sequence of entity names and relationship names.

9. The non-transitory computer-readable storage medium of claim 8, wherein the method further comprises using the displayed path expressions to determine how to access an instance of the second entity by using an instance of the first entity.

10. The non-transitory computer-readable storage medium of claim 8, wherein the entities in the data model are associated with tables in a relational database, and wherein the method further comprises using the displayed path expressions to determine a join statement in the relational database.

11. The non-transitory computer-readable storage medium of claim 7, wherein the method further comprises:
receiving a second request from the user to highlight entities whose names include a second search string;
determining entities in the data model whose names include the second search string; and
highlighting vertices in the displayed instance graph visualization which are associated with the determined entities.

12. The non-transitory computer-readable storage medium of claim 7, wherein the method further comprises:
receiving a third request from the user to highlight relationships whose names include a third search string;
determining relationships in the data model whose names include the third search string; and
highlighting edges in the displayed instance graph visualization which are associated with the determined relationships.

13. A computer system, comprising:
a processor; and
a computer-readable storage device storing instructions executed by the computer system cause the computer system to perform a method for displaying a data model, the instructions comprising:
instructions for generating a model graph visualization to represent the data model and an instance graph visualization to represent an instance of the data model, wherein the data model includes entities which are related by relationships, wherein a vertex represents an entity in the model graph visualization or an entity instance in the instance graph visualization, and wherein an edge represents a relationship in the model graph visualization or a relationship instance in the instance graph visualization;
instructions for concurrently displaying the model graph visualization and the instance graph visualization to a user;
instructions for receiving a first request from the user to query a relationship between a first entity and a second entity in the data model, wherein the first request comprises selecting an edge in the displayed model graph visualization by the user;
instructions, in response to the received first request, for determining paths in the displayed instance graph visualization between a first vertex which represents a first entity instance and a second vertex which represents a second entity instance, wherein each determined path in the displayed instance graph visualization represents an alternating sequence of entity instances and relationship instances in the instance of the data model; and
instructions for displaying highlighting the determined paths in the displayed instance graph visualization to the user for exploring how the first entity and the second entity are related to one another in the data model.

14. The computer system of claim 13, wherein the instructions further comprise instructions for displaying path expressions which are associated with the determined paths, wherein a path expression is an alternating sequence of entity names and relationship names.

15. The computer system of claim 14, wherein the instructions further comprise instructions for using the determined path expressions to determine how to access an instance of the second entity by using an instance of the first entity.

16. The computer system of claim 14, wherein the entities in the data model are associated with tables in a relational database, and wherein the instructions further comprise instructions for using the displayed path expressions to determine a join statement in the relational database.

17. The computer system of claim 13, wherein the instructions further comprise:
- instructions for receiving a second request from the user to highlight entities whose names include a second search string;
- instructions for determining entities in the data model whose names include the second search string; and
- instructions for highlighting vertices in the displayed instance graph visualization which are associated with the determined entities.

18. The computer system of claim 13, wherein the instructions further comprises:
- instructions for receiving a third request from the user to highlight relationships whose names include a third search string;
- instructions for determining relationships in the data model whose names include the third search string; and
- instructions for highlighting edges in the displayed instance graph visualization which are associated with the determined relationships.

19. An apparatus for displaying a data model, comprising:
- an inputting mechanism configured to receive a first request from a user to query the relationship of a first entity and a second entity are related to one another in the data model;
- a processing mechanism configured to:
  - generate a model graph visualization to represent the data model and an instance graph visualization to represent an instance of the data model, wherein the data model includes entities which are related by relationships, wherein a vertex represents an entity in the model graph visualization or an entity instance in the instance graph visualization, and wherein an edge represents a relationship in the model graph visualization or a relationship instance in the instance graph visualization;
  - concurrently display the model graph visualization and the instance graph visualization to the user;
  - in response to the received first request, determine paths in the displayed instance graph visualization between a first vertex which represents a first entity instance and a second vertex which represents a second entity instance, wherein each determined path in the displayed instance graph visualization represents an alternating sequence of entity instances and relationship instances in the instance of the data model, and wherein the received first request comprises selecting an edge in the displayed model graph visualization by the user; and
  - highlight the determined paths in the displayed instance graph visualization to the user for exploring how the first entity and the second entity are related to one another in the data model.

20. The apparatus of claim 19, wherein a displaying mechanism is configured to display path expressions which are associated with the determined paths, wherein a path expression is an alternating sequence of entity names and relationship names.

21. The apparatus of claim 20, wherein the processing mechanism is configured to use the displayed path expressions to determine how to access an instance of the second entity by using an instance of the first entity.

22. The apparatus of claim 20, wherein the entities in the data model are associated with tables in a relational database, and wherein the instructions further comprise instructions for using the displayed path expressions to determine a join statement in the relational database.

\* \* \* \* \*